United States Patent [19]

Wilms

[11] 4,050,585

[45] Sept. 27, 1977

[54] HYDRAULICALLY BALANCED MARINE LOADING ARM

[75] Inventor: Carl A. Wilms, La Habra, Calif.

[73] Assignee: Ameron, Inc., Monterey Park, Calif.

[21] Appl. No.: 629,876

[22] Filed: Nov. 7, 1975

[51] Int. Cl.[2] .......................... B67D 5/04; F16L 27/00

[52] U.S. Cl. ...................................... 212/48; 137/615; 141/387; 212/54

[58] Field of Search .................... 214/1 CM, 142, 143; 137/615, 236; 212/48, 54; 267/120; 160/188, 190, 191, 192; 141/387, 388

[56] References Cited

U.S. PATENT DOCUMENTS

| | | | |
|---|---|---|---|
| 3,340,907 | 9/1967 | Bily | 212/48 |
| 3,455,333 | 7/1969 | Bily | 212/49 |
| 3,651,832 | 3/1972 | Meyer | 137/615 |
| 3,790,002 | 2/1974 | Germond et al. | 214/1 CM |
| 3,889,728 | 6/1975 | Riche | 137/615 |
| 3,938,793 | 2/1976 | Kaptanis et al. | 267/120 |

FOREIGN PATENT DOCUMENTS

| | | | |
|---|---|---|---|
| 580,640 | 8/1959 | Canada | 137/615 |

*Primary Examiner*—Albert J. Makay
*Assistant Examiner*—Carl Rowold
*Attorney, Agent, or Firm*—Christie, Parker & Hale

[57] ABSTRACT

A loading arm for transferring petroleum products at sea between two floating vessels. The loading arm structure includes a rotatably supported column having a boom hingedly supported at the upper end of the column for rotation about a first horizontal axis. An outer arm is hingedly connected at one end to the outer end of the boom for rotation about a second horizontal axis. A hydraulic/pneumatic spring includes a hydraulic cylinder connected between the column and the boom, the hydraulic fluid in the cylinder being pressurized from a large volume of gas for counterbalancing the weight of the boom and the arm. A second hydraulic/pneumatic spring is coupled between the column and a lever arm rotatable about the first horizontal axis. Linkage means couples the lever arm to the outer arm for maintaining the lever arm and outer arm in fixed angular relationship relative to each other as they rotate. The gas pressure in the hydraulic/pneumatic springs is adjustable to accommodate changes in load.

5 Claims, 8 Drawing Figures

Fig. 3
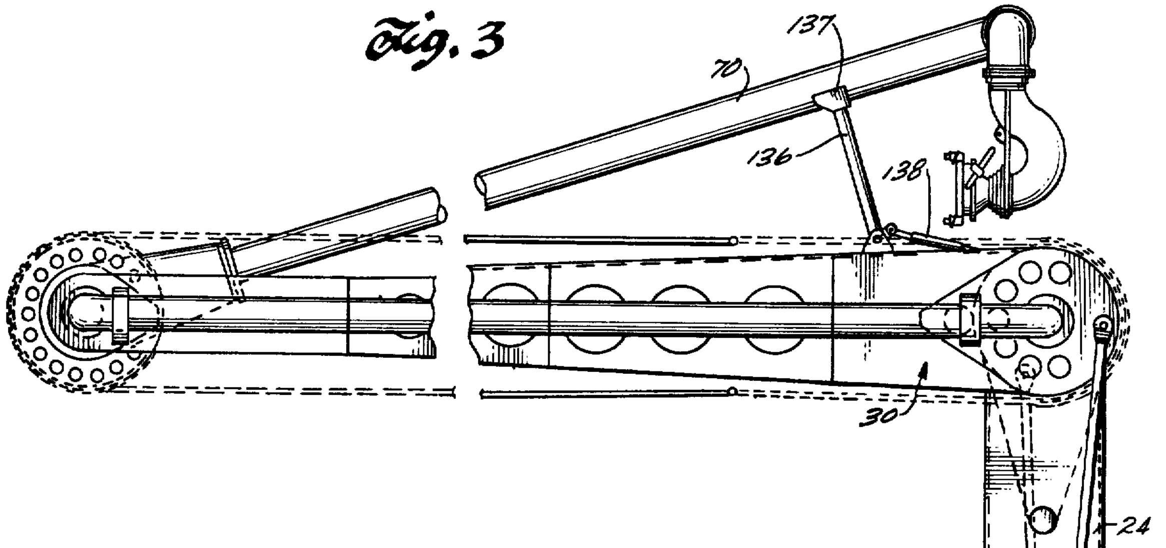
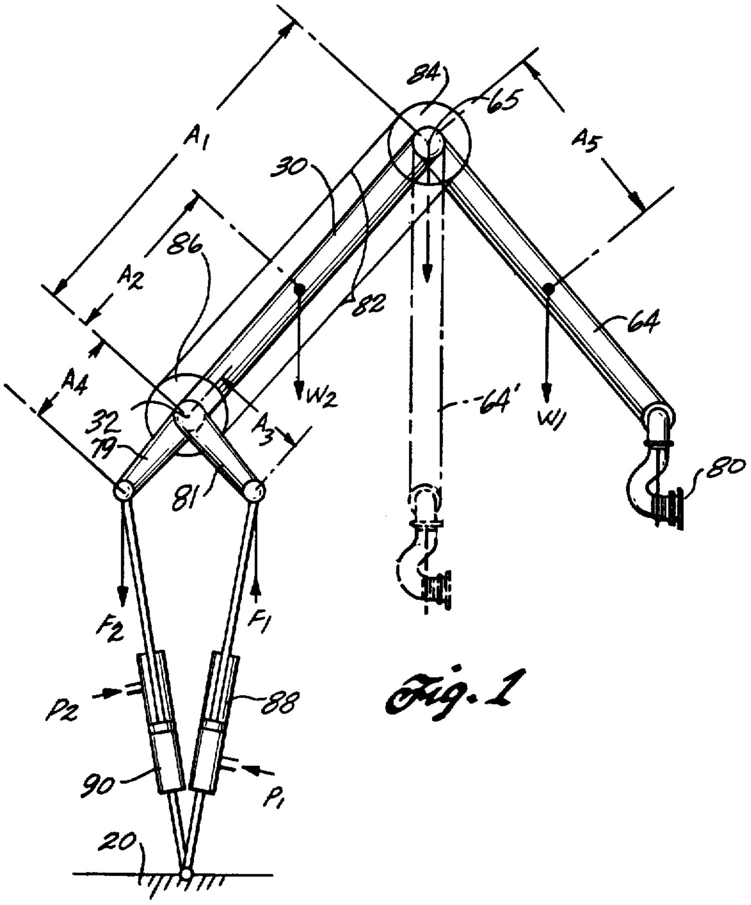
Fig. 1

50
35
36
84'
84
68
66
65
72
32
71
69
74
64
70

HYDRAULICALLY BALANCED MARINE LOADING ARM

FIELD OF THE INVENTION

This invention relates to transferring fluids between floating vessels, and more particularly, is concerned with an articulated loading arm for supporting rigid pipe sections coupled by swiveled joints.

BACKGROUND OF THE INVENTION

Various types of marine cargo transfer devices have heretofore been proposed for loading a marine vessel, either from another vessel or from a shore facility, with fuel oil, crude oil, or other types of fluid cargo. Because of the shear weight and volume of the fluids being transferred, such marine loading equipment is necessarily large and difficult to handle. Particularly in transferring fluid cargoes at sea between two floating vessels, both of which are subject to motions of heave, roll, pitch, and yaw, as well as moving toward and away from each other under the action of wind and wave, severe strains can be placed on such cargo transfer equipment. It has been the practice, particularly in transferring fluids between two floating vessels, to utilize flexible hoses, the weight being supported by cranes or other types of multiple pulley and cable arrangements from one or both of the vessels. Flexible hoses allow for relative motions between the two vessels. Such arrangements have not proved practical for transferring petroleun products that are liquefied at low temperatures, such as propane which must be maintained at temperatures below −50° F, or a liquefied natural gas which must be maintained at cryogenic temperatures. Normal hose materials are not suitable for such low operating temperatures. While special flexible hoses have been provided for conducting very low temperature fluids, such hoses do not have the strength and durability to operate under the severe conditions encountered at sea.

Marine loading arms have been developed which utilize rigid pipe sections coupled by swivel joints, such as described, for example, in U.S. Pat. No. RE 25,855. By using rigid pipe sections, they can be made of materials, such as stainless steel, which retain their strength at low temperatures. However, such cargo transfer devices have to been suitable for transfer between vessels on the high seas, but have been restricted to dock side loading where the arms have been permanently mounted on the dock and remain relatively stationary. The only motion of the vessel is the change in draft with loading and unloading of the cargo. To make the loading arms more maneuverable, the arms have been counterbalanced by weights so that the arms remain substantially statically balanced in all operating positions.

However, such rigid counterbalanced arms are not suitable for use in transferring fluid cargo between two floating vessels where inertial forces due to the continuous movement of the two vessels as they react to wind and wave conditions are substantial. In the past, it has been the practice to use the fluid transporting pipes themselves as the structural members to reduce the total weight of the arms and counterbalancing weights. However, such an arrangement puts undue strain on the swivel joints which interconnect the pipe sections. To use a supporting structure for the pipe to transfer the load to the base greatly increases the amount of mass required to counterbalance the structure. The greater the mass of the structure, the greater the inertial forces which are generated by the motions of the vessels.

SUMMARY OF THE INVENTION

The present invention is directed to a loading arm structure for transferring fluid between two floating vessels. The present invention is concerned with an improved loading arm structure in which the total mass of the counterbalanced articulated arms is reduced to minimize the inertial forces. At the same time the structure is strengthened by utilizing external hinge joints separate from the pipe swivels to remove the dynamic loads from the swivels. Adjustable counter-balancing forces are applied to the loading arms to compensate for changes in weight of the arms between the loaded and unloaded conditions. Thus a loading arm for floating vessels is provided capable of withstanding dynamic forces due to all types of wave motion and yet is lighter and less expensive to manufacture.

These and other advantages of the present invention are achieved by providing an articulated loading arm structure for transferring fluid cargo between floating vessels in which a column is rotatably supported on a base for rotation about a vertical axis. A boom is hinged at one end to the top of the column for rotation about a first horizontal axis and an outer arm is connected by a hinge at one end to the outer end of the boom for rotation about a second horizontal axis parallel to the first axis. Linkage means couples the outer arm to a lever arm rotatable about the first horizontal axis. A hydraulic/pneumatic system operates through hydraulic cylinders to apply a counterbalancing force between the boom and the column about the first horizontal axis and between the lever arm and the column to apply counterbalancing force through the linkage means to the outer arm about the second horizontal axis. The counterbalancing system adds very little weight to the boom and outer arm. At the same time the boom and arm support fluid pipe sections which are joined by swivels that are coaxial with the first and second horizontal axis. Substantially no load is transferred through the pipe swivels. The pressure of the hydraulic/pneumatic system can be remotely controlled to correct for changes in loading imposed by the boom and outer arm when the pipe sections are empty and when the pipe sections are filled with fluid.

DESCRIPTION OF THE DRAWINGS

For a better understanding of the invention reference should be made to the accompanying drawings, wherein:

FIG. 1 is a schematic diagram used in illustrating the principle of operation;

FIG. 3 is an elevational view of loading arm in stored position;

DETAILED DESCRIPTION

Figure 2:
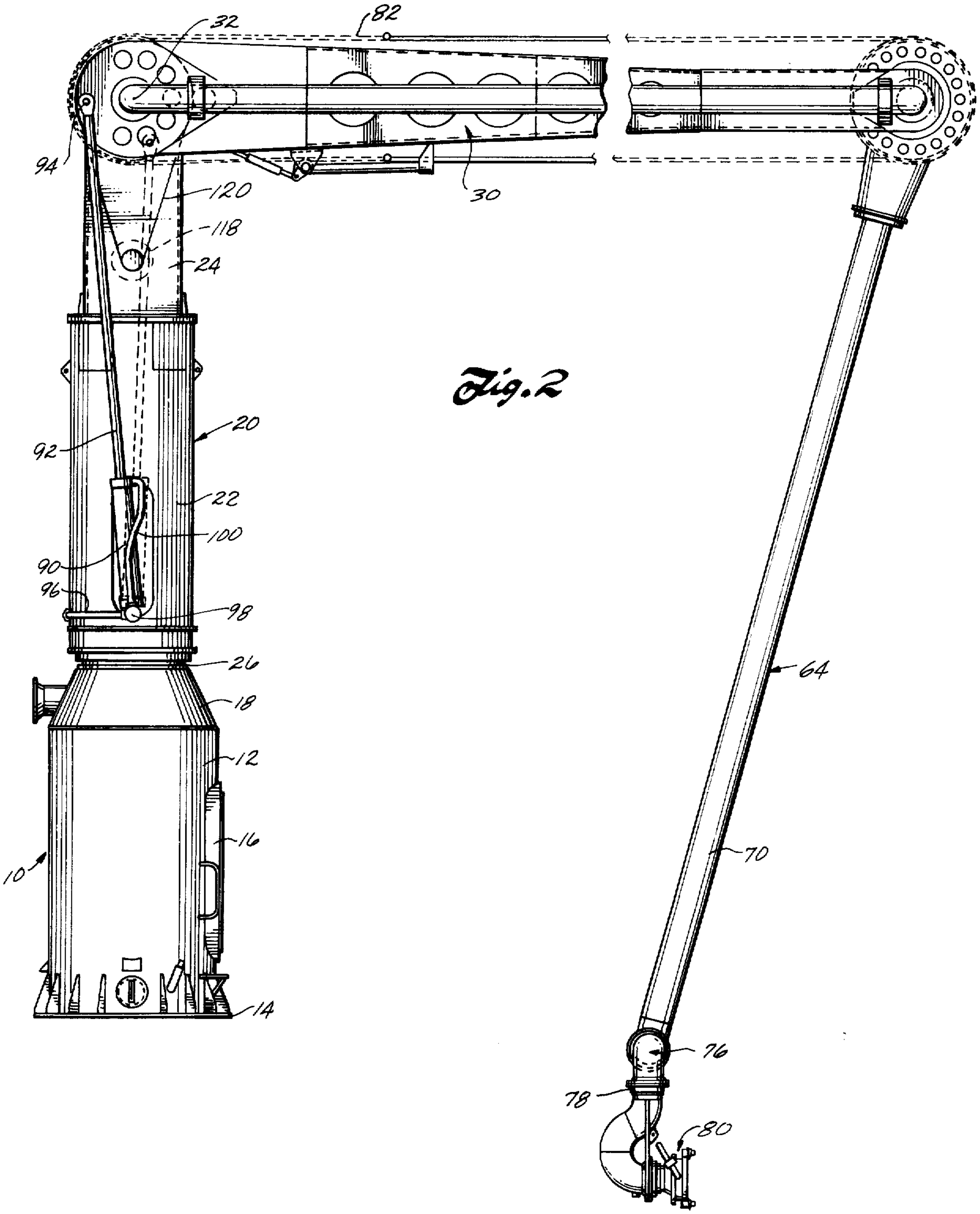
FIG. 2 is an elevational view of loading arm in operating position.
Figure 5:
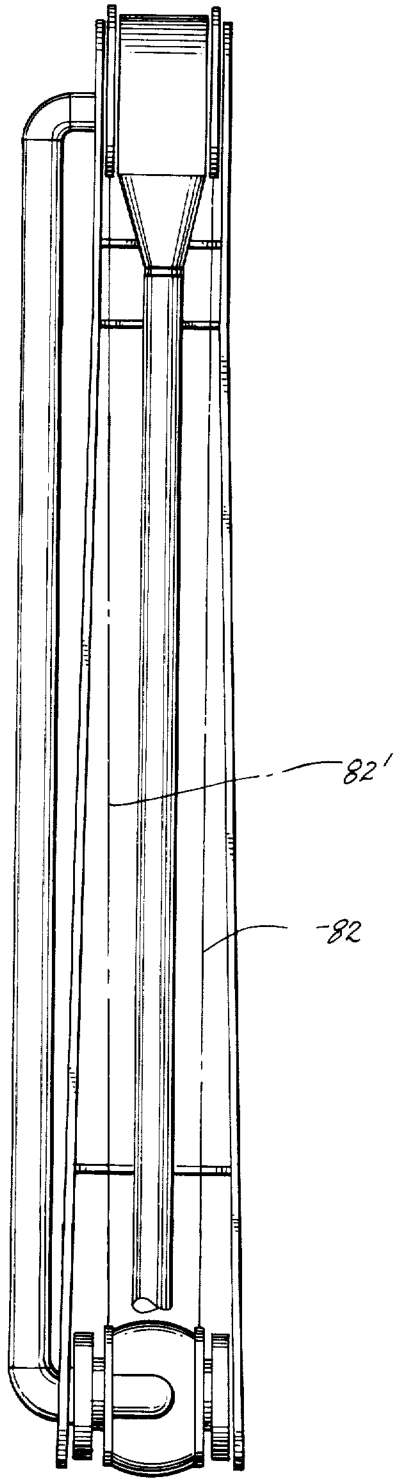
FIG. 5 is a top view of loading arm.

Referring to the drawings in detail, the loading arm structure includes a base 10 in the form of a cylindrical shell 12 resting on a mounting plate 14 which is bolted or otherwise secured to the deck or other supporting structure. An access door or hatch 16 provides an entrance into the interior of the base structure where the power equipment for driving the loading arm, such as hydraulic pumps, compressed gas tanks, and other control equipment as hereinafter described, is housed. The upper end of the base 10 terminates in a frustoconical section 18.

Rotatably supported on the base 10 is a vertical column indicated generally at 20 in the form of two sections, a cylindrical lower section 22 and a bifurcated upper section 24. The upper section 24 is bolted or otherwise secured to the lower section 22 for the purpose of assembly or disassembly in the field. The lower section 22 is rotatably supported on the base by a suitable bearing 26 through which the weight and cantilever load of the loading arm assembly is transferred to the base 10.

The upper section 24 terminates in a hinged connection to a boom assembly indicated generally at 30, the hinge assembly having a horizontal pivot axis indicated at 32 about which the boom 30 rotates relative to the supporting column 20. The boom is preferably constructed in the form of a box girder with a pair of side plates 33 and 34 joined by upper and lower plates 35 and 36 plus internal webbing to give the boom stiffness and rigidity with a minimum of weight. The upper end of the upper bifurcated section 24 of the column forms a pair of parallel side frame plates 38 and 40 which are spaced apart so as to fit inside the side plates 33 and 34 of the boom 30. The hinge connection is provided by a pair of bearing supporting rings 42 and 44 secured to the side plates 38 and 40 and coaxial with the horizontal hinge axis 32. Suitable bearings 46 and 48 connect the rings 42 and 44, respectively, to the side plates 33 and 34 to provide rotational support for the boom 30 from the column 20 about the horizontal hinge axis 32.

The boom supports a section of pipe 50 which is secured along the side of the boom by a plurality of supporting brackets 52. The inner end of the pipe 50 is coupled to a pipe section 54, extending up through the center of the column 20, by an S-shaped swivel joint indicated generally at 56. The S-shape of the joint allows the joint to swivel about the common horizontal hinge axis 32, the joint passing through the center of the supporting ring 44 and through an opening in the side plate 34 of the boom 30. The lower end of the pipe section 54 is connected through a swivel joint 60 to a 90° elbow having a connecting flange 62 projecting outside of the base 10, which permits the loading arm assembly to be coupled to a storage tank or the like through a conventional external pipe line.

Figure 7:
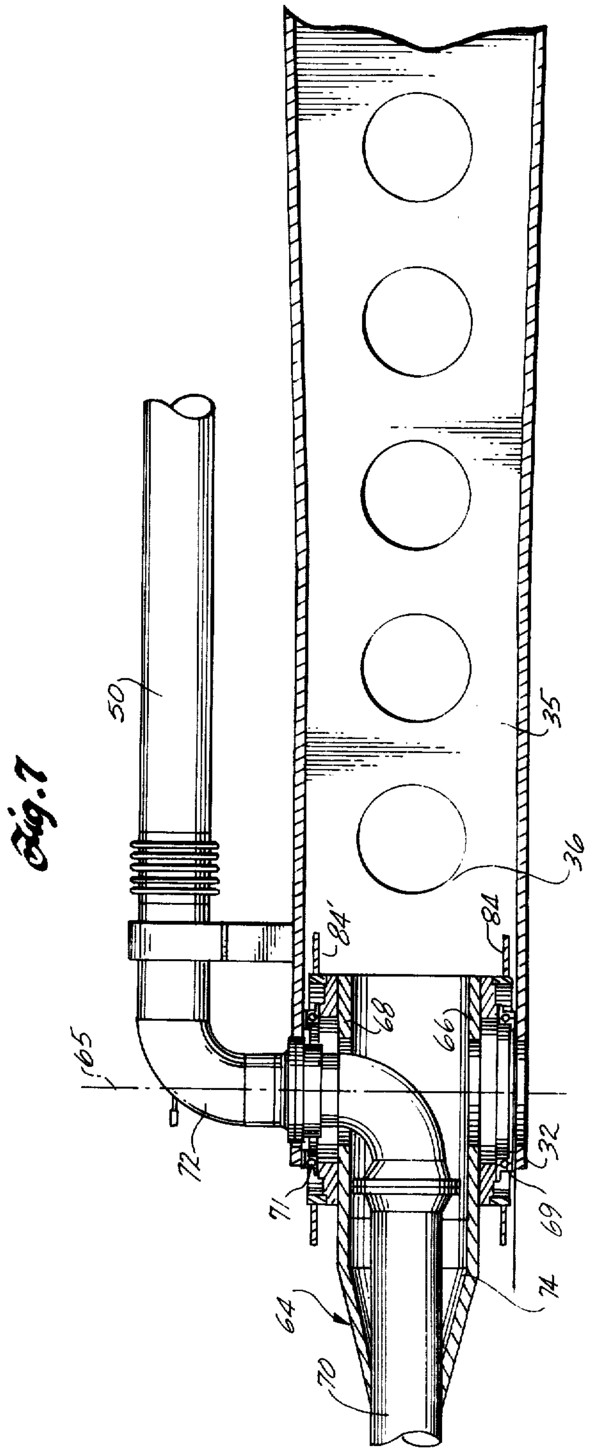
FIG. 7 is a partial view of outer pivot connection of loading arm.

The outer end of the boom 30 is hingedly connected to an outer arm assembly indicated generally at 64. See FIG. 7. The outer arm assembly is hinged to the boom 30 for rotation about a horizontal hinge axis 65 which is parallel to the horizontal hinge axis 32. The outer arm assembly 64 includes a pair of flat parallel side plates 66 and 68 which are positioned parallel to and inside of the side plates 32 and 34 of the boom 30. A pair of axially aligned bearings 69 and 71 join the side plates 66 and 68 to the side plates of the boom for relative rotation about the axis 65. Main supporting structure of the outer arm

64 is a pipe section 70, the inner end of which is coupled to the pipe section 50 through an S-shaped swivel joint 72, the swivel axis of which is aligned with the horizontal hinge axis 65. The side plates 66 and 68 are secured to the pipe section 70 through suitable frame plates 74 which are welded into a unitary structure.

The outer end of the pipe section 70 is connected to a pair of swivel joints 76 and 78 terminating in a suitable quick-disconnect coupling arrangement 80 for connecting the end of the pipe to the other vessel. The coupling assembly may include a suitable cutoff valve to prevent spillage when the coupling is disconnected.

One of the significant features of the present invention is the arrangement by which the weight of the boom 30 and outer arm 64 are balanced at the respective hinge axes. When the outer arm, for example, is in any position other than extending vertically downwardly from its hinge point, the weight of the arm produces a couple which tends to rotate it back to the vertical position. The counteract this couple and maintain the arm balanced in any angular position relative to its hinge axis, a hydraulic/pneumatic counterbalancing system is provided, as hereinafter described. Similarly the couple produced by the weight of the boom and the arm about the axis 32 is counterbalanced by a hydraulic/pneumatic counterbalancing system.

The operation of the counterbalancing systems can best be understood by reference to the schematic diagram of FIG. 1. The boom 30, which pivots about the axis 32, has a weight $W_2$ which produces a downward force acting at the center of gravity of the boom, which is at a distance $A_2$ from the pivot axis. The outer arm 64 has a weight $W_1$ producing an equivalent force acting at the center of gravity of the outer arm which is at a distance $A_5$ from the pivot axis 65 of the outer arm 64. To counterbalance the combined weight of the boom 30 and outer arm 64, a force $F_2$ acting vertically on a point along an extension arm 79 attached to the boom at the axis of the boom 30 at a distance $A_4$ from the pivot axis 32 produces equilibrium if the outer arm 64 is in the vertical position, indicated at 64', and if the following condition is met, namely, $F_2 A_4 = W_1 A_1 + W_2 A_2$, where $A_1$ is the distance between the two pivot axes 32 and 65.

To counterbalance the outer arm as it is moved away from the vertical position, the outer arm 64 is linked to a lever arm 81 pivoted on the horizontal axis 32. A closed loop chain 82 links the arm 64 to the lever arm 81. The chain 82 pases around a sprocket 84 having its center on the axis 65, the sprocket 84 being rigidly attached to the outer arm 64. The other end of the chain 82 passes around a sprocket 86 centered on the axis 32 and rigidly attached to the lever arm 81. By making the lever arm 81 parallel to the outer arm 64, it will be seen that an upward force $F_1$ applied to the lever arm 81 will counterbalance the weight $W_1$ of the outer arm 64, according to the relationship $F_1 A_3 = W_1 A_5$, where $A_3$ is the effective length of the lever arm 81 and $A_5$ is the distance from the center of gravity of the outer arm to the pivot axis 65. Since the force $F_1$ produces equilibrium of the outer arm 64 in pivoting of the arm 64 about the axis 65, rotation of the arm 64 from the vertical position does not affect the force $F_2$ required to provide equilibrium of the boom 30 and arm 64. As will hereinafter be described in detail, the forces $F_1$ and $F_2$ are applied respectively by hydraulic linear actuators or cylinders 88 and 90 connected respectively between the lever arm 81 and the column 20 and the extension of the boom and the column 20. By making the overall length of the linear actuators very long relative to the lengths $A_3$ and $A_4$, the linear actuators effectively act in a vertical direction.

Figure 4:
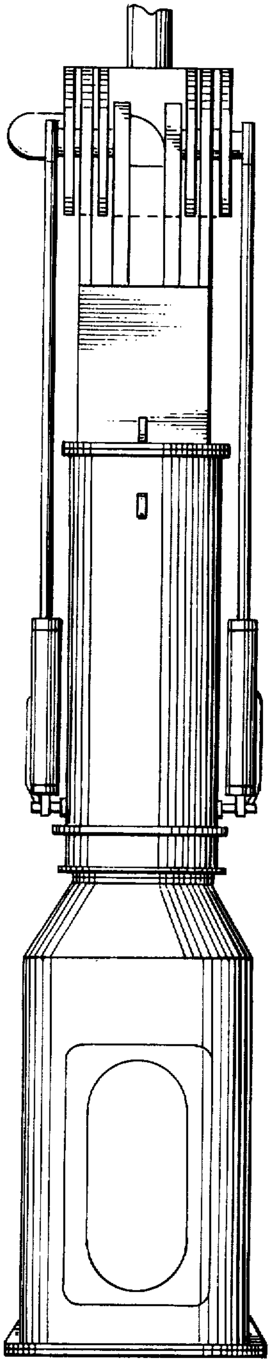
FIG. 4 is an end view of loading arm.
Figure 6:
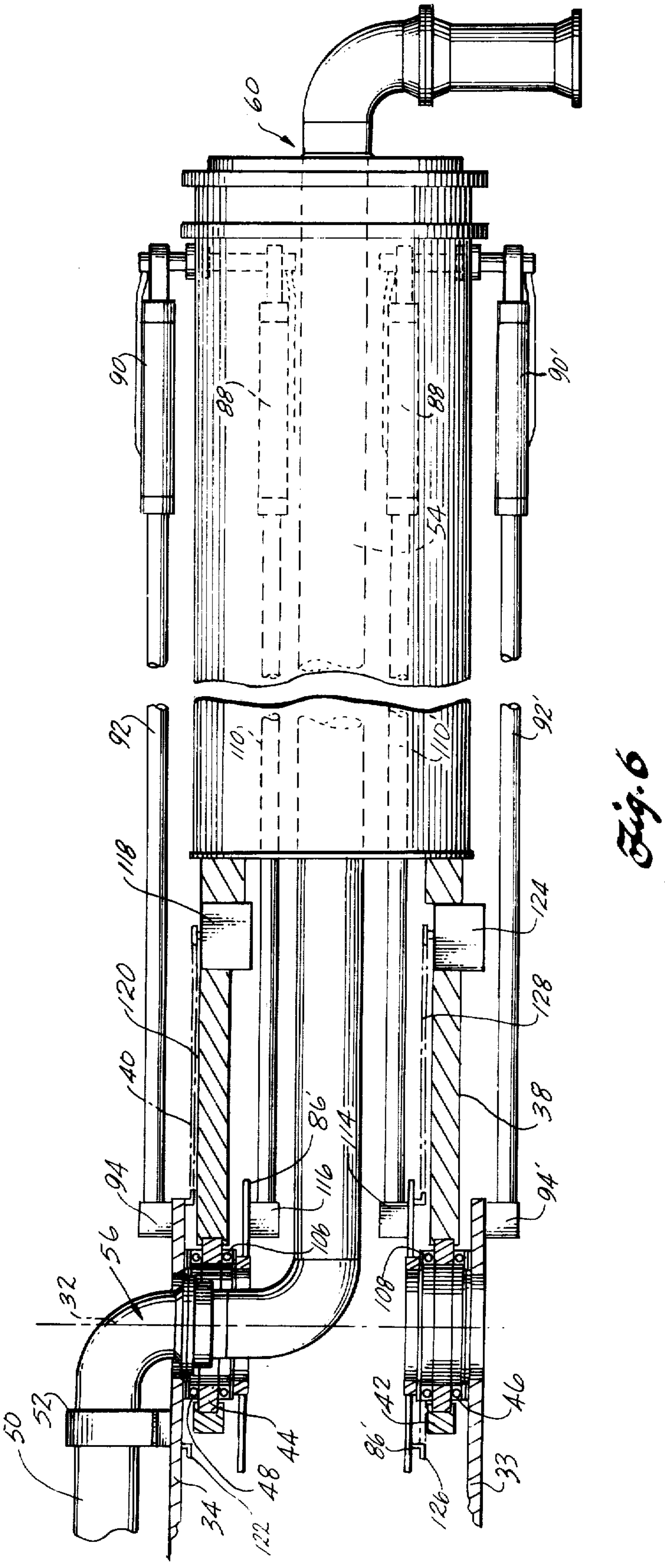
FIG. 6 is a partial view of inner pivot connection of loading arm.

Referring again to FIGS. 2, 4, and 6, it will be seen that counterbalancing of the boom is provided by a pair of hydraulic cylinders 90 and 90' mounted outside of the column 20. The lower ends of the cylinders are pivotally connected to the outer wall of the column. Actuating rods 92 and 92' extend upwardly from the cylinders 90 and 90' and are pivotally connected to the side plates 33 and 34 of the boom at a point along the longitudinal axis of the boom, as indicated at 94 and 94'. Hydraulic fluid under pressure is admitted to the upper end of the cylinders 90 and 90' by a hydraulic line 96 through rotary couplings 98 and input lines 100. Applying fluid under pressure to the line 96 produces a downward force on the rod 92 tending to lift the outer end of the boom 30. By adjusting the level of hydraulic pressure, the force exerted on the boom produces equilibrium of the boom in the manner described above in connected with FIG. 1.

Counterbalancing of the outer arm 64 is provided by the pair of sprockets 84 and 84' which are secured to the frame plates 66 and 68 of the outer arm assembly. The sprockets are coaxial with the hinge axis 65. A similar pair of sprockets 86 and 86' of the same diameter as sprockets 84 and 84' are rotatably mounted on the inside of the side plates 38 and 40 by suitable bearings 106 and 108. The sprockets 84 and 84' are coaxial with hinge axis 32. Chain loops 82 and 82' link the sprockets.

A pair of linear actuators or hydraulic cylinders 88 and 88' are mounted in the lower inside end of the column 20. The cylinders actuate a pair of rods 110 and 110' which are pivotally connected at their upper ends to the sprockets 86 and 86', as indicated at 114 and 116, respectively. The centerline between the hinge axis 32 and the pivot connections 114 and 116 is held parallel with the outer arm 64 by the chain loops 82 and 82'. Hydraulic fluid under pressure admitted to the lower end of the cylinders 88 and 88' produces a counterbalancing force for the outer arm in the manner described above in connection with FIG. 1.

While the boom 30 is counterbalanced by the hydraulic cylinders 90 and 90', in order to rotate the boom about the axis 32, a hyraulic motor 118 mounted on one side of the column 20 drives a chain 120 which extends around a sprocket 122 secured to the boom frame 34. Similarly a hydraulic motor 124 mounted on the opposite side of the column 20 drives a sprocket 126 through a chain 128. The sprocket 126 is secured to and coaxial with the sprocket 86'. Thus operation of the hydraulic motor 124 operates to swing the outer arm 64 about its hinge connection to the end of the boom 30. A hydraulic motor 130 is also mounted on the column at the lower end for driving a pinion which engages a ring gear on the base 10 for rotating the column and associated arms about the vertical axis.

As shown in FIG. 3, when the loading arm assembly is not in use, it is placed in a parked position in which the boom 30 is horizontally positioned, and the outer arm 64 is swung back along the boom and supported in a hinge supporting bracket 136 which has a cradle 137 that receives the outer pipe 70. A hydraulic cylinder 138 raises the support bracket 136 into position to receive the pipe 70.

Figure 8:
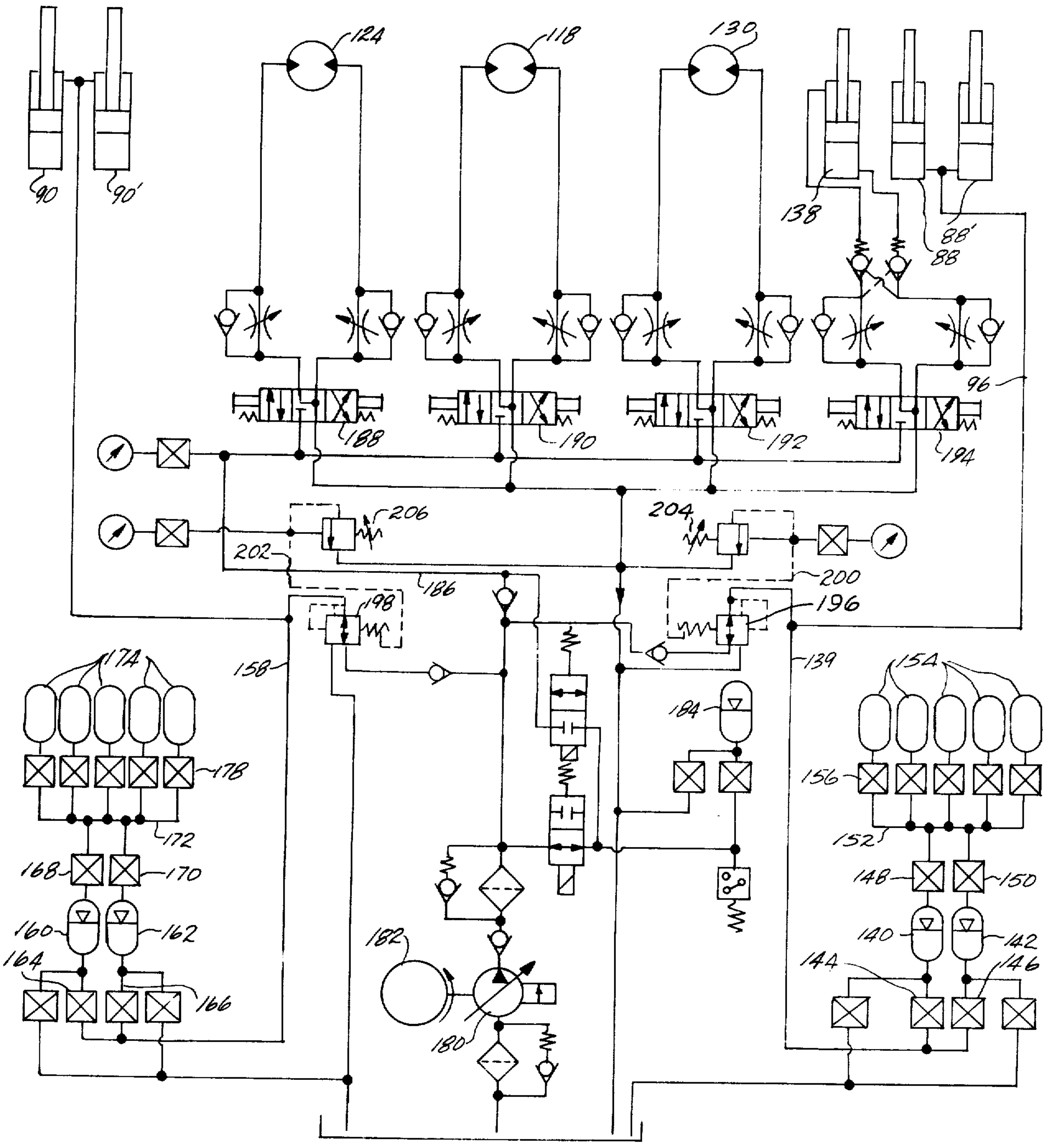
FIG. 8 is a schematic diagram of the hydraulic/-pneumatic system

To provide substantially constant counterbalancing force by means of the cylinders 88, 88' and 90, 90', the cylinders are pressurized by a hydraulic/pneumatic system shown schematically in FIG. 8. As shown schematically, the lower ends of the cylinders 88 and 88' for counterbalancing the outer arm are connected by the hydraulic lines 96 and 139 to a pair of accumulators 140 and 142 through a pair of shutoff valves 144 and 146. The upper end of the accumulators 140 and 142 are connected respectively through a pair of shutoff valves 148 and 150 to a manifold 152 to which are connected a plurality of tanks 154 pressurized with a suitable inert gas. The tanks 154 are individually connected to the manifold 152 through shutoff valves 156. Similarly the upper ends of the cylinders 90 and 90' are connected by a hydraulic line 158 to the lower end of a pair of accumulators 160 and 162 through suitable shutoff valves 164 and 166. The upper ends of the accumulators 160 and 162 are connected respectively through a pair of shutoff valves 168 and 170 to a manifold 172 to which are connected a plurality of tanks 174, each through its own shutoff valve 178. Both the tank groups 154 and 174 may be pressurized through the manifolds 152 and 172 from a suitable inert gas source (not shown).

Hydraulic fluid under pressure for operating the hydraulic motors 118, 124, and 130, the support operating cylinder 138, and for pressurizing the hydraulic side of the accumulators 140, 142, 160 and 162 is derived from a suitable variable displacement piston-type pump 180 driven by an electric motor 182. The pump is backed up by an accumulator 184 for emergency operation. The outlet side of the pump is connected through an output line 186 to a group of control valves, a valve 188 controlling delivery of hydraulic fluid to the hydraulic motor 124, a control valve 190 controlling the flow of hydraulic fluid to the hydraulic motor 118, a control valve 192 controlling flow of hydraulic fluid to the hydraulic motor 130, and a control valve 194 controlling fluid to the support cylinder 138. Hydraulic fluid is also provided from the pump to the hydraulic lines 139 and 158, respectively, through remotely controlled combination pressure reducing and pressure relief valves 196 and 198, respectively. The combination pressure reducing and pressure relief valves 196 and 198 can be adjusted to increase the pressure in the counterbalancing cylinders by admitting fluid into the accumulators under higher pressure so as to compress the gas in the accumulators. Conversely, the combination pressure reducing and pressure relief valves can bleed off pressure from the hydraulic side of the accumulators to allow the gas to expand and decrease the pressure in the counterbalancing system. The pressure level of the combination pressure reducing and pressure relief valves 196 and 198 is remotely controlled by regulating the pressure on vent lines 200 and 202, respectively, through adjustable relief valves 204 and 206, respectively.

From the above description it will be appreciated that a loading arm assembly is provided which provides fluid coupling between two vessels, for example, in which the static loads of the arms is fully counterbalanced. At the same time, the counterbalancing system imposes a minimum effective mass to the moving arms, so as the minimize the inertial loads imposed on the system by relative movement between the two vessels.

What is claimed is:

1. An articulated loading arm structure for transferring fluid, comprising: a supporting base, a column rotatably supported on the base for rotation about a vertical axis, a boom means hingedly securing the boom at one end to the column for rotation of the boom about a first horizontal axis, an outer arm, means hingedly connecting one end of the arm to the outer end of the boom for rotation about a second horizontal axis parallel to the first axis of rotation of the boom, first means connected between the column and the boom means exerting a couple tending to rotate the boom about the first horizontal axis in the opposite direction from the couple produced by the weight of the boom and arm, said first means including at least one hydraulic cylinder having one end pivotally connected to the column and the other pivotally connected to the boom at a point offset from the first horizontal axis, and means including a volume of compressed gas for pressurizing hydraulic fluid in the cylinder, the volume of gas being large compared to the displacement volume of the hydraulic cylinder, second means connected between the column and the arm exerting a couple tending to rotate the arm about the second horizontal axis in the opposite direction from the couple produced by the weight of the arm, said second means including a lever arm rotatable about said first horizontal axis, and linkage means coupling the lever arm to the outer arm, the linkage means maintaining the lever arm and outer arm in fixed angular relationship relative to each other as they rotate about said first and second horizontal axes, the second means further including at least one hydraulic cylinder having one end pivotally connected to the column and the other end connected to the lever arm, and means including a volume of compressed gas for pressurizing hydraulic fluid in the hydraulic cylinder, the volume of gas being large compared to the displacement volume of the hydraulic cylinder, and means for adjusting the pressure of the gas for pressurizing the hydraulic fluid respectively in the first and second hydraulic cylinders.

2. Apparatus of claim 1 further including a first motor drive mounted on the column, first transmission means coupling the first motor drive to the boom for rotating the boom relative to the column about said first horizontal axis, a second motor drive mounted on the column, and second transmission means coupling the second drive means to the lever arm for rotating the lever arm relative to the boom about said second horizontal axis.

3. Apparatus of claim 2 wherein the first motor drive rotates the boom through substantially 180° about said first horizontal axis between an operating position and a storage position, and the second motor drive means rotates the arm vertically about said second horizontal axis into parking position in which the arm extends back against the boom, and means securing the arm to the boom in the parking position.

4. Apparatus of claim 1 further including rigid pipe means including a first pipe section supported by the column, a second pipe section supported by the boom, and a third pipe section supported by the arm, a first swivel pipe joint having an axis of rotation coaxial with said first horizontal axis coupling the first pipe section to the second pipe section, and a second swivel pipe joint having an axis of rotation coaxial with the second horizontal axis coupling the second pipe section to the third pipe section.

5. Apparatus of claim 1 further including first motor drive means for rotating the boom relative to the column about said first horizontal axis, and second motor drive means for rotating the level arm relative to the boom about said second horizontal axis.

* * * * *